No. 703,342. Patented June 24, 1902.
L. P. GRAHAM.
CORN PLANTER.
(Application filed Feb. 20, 1902.)
(No Model.) 2 Sheets—Sheet 1.
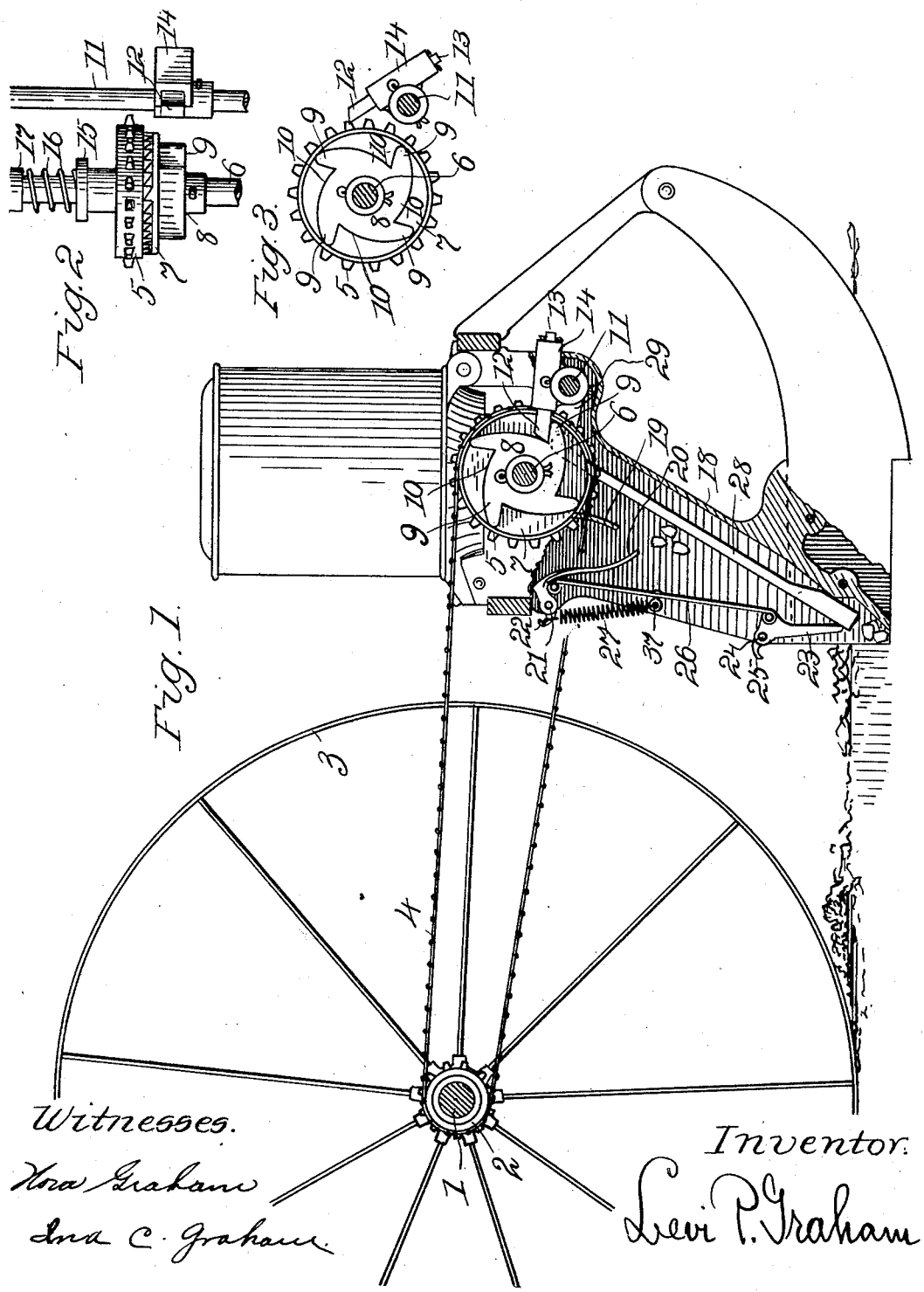
Witnesses.
Nora Graham
Ina C. Graham
Inventor.
Levi P. Graham

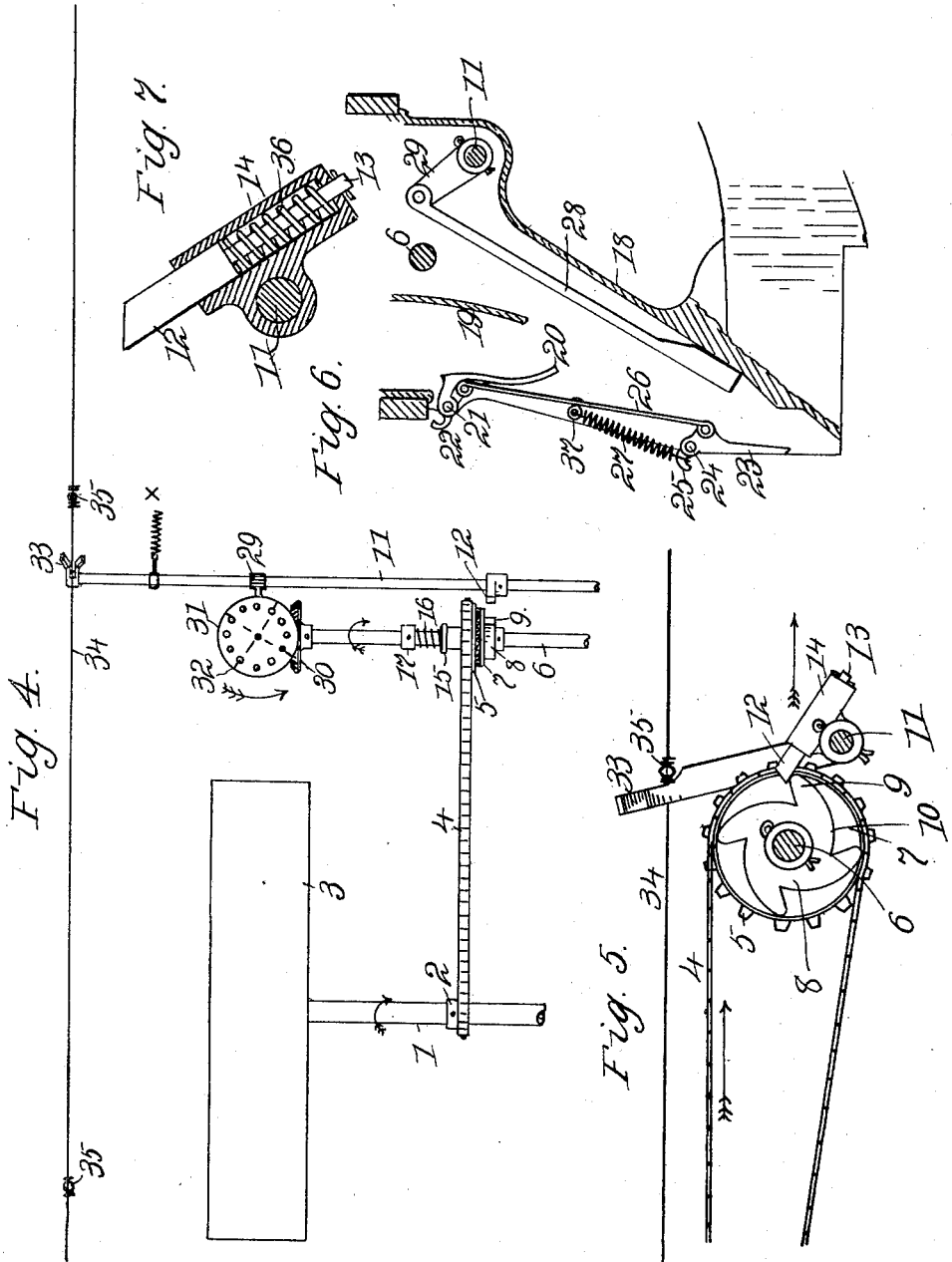

UNITED STATES PATENT OFFICE.

LEVI P. GRAHAM, OF DECATUR, ILLINOIS.

CORN-PLANTER.

SPECIFICATION forming part of Letters Patent No. 703,342, dated June 24, 1902.

Application filed February 20, 1902. Serial No. 94,972. (No model.)

*To all whom it may concern:*

Be it known that I, LEVI P. GRAHAM, of the city of Decatur, county of Macon, and State of Illinois, have invented certain new and useful Improvements in Corn-Planters, of which the following is a specification.

This invention relates to planters in which the first drop is driven from the covering-wheels, the cells of the seed-wheel receive each a single grain, and the second drop is actuated by the knots on a check-row wire or by hand or foot pressure. In the development of this class of planters the first drop was originally geared fast with the covering-wheels, so as to drop the required number of grains from the seed-wheel while the planter was traveling from one cross-row to another. The grains dropped from the seed-wheel accumulated in the second drop until a cross-row was reached and the second drop was actuated at the cross-row by a knot on a wire. This plan was found to be unsatisfactory for the reason that slippage of the covering-wheels and the rise and fall thereof over obstacles present in plowed ground would throw the gearing out of time, and first two grains and then four grains would at times be deposited where it was desired to plant three grains in each hill. To overcome this and other disadvantages, the gearing between the covering-wheels and the first drop was afterward timed to drop the number of grains required in a hill while traveling a distance less than the distance between cross-rows, a clutch was introduced into the gearing, means was provided for disengaging the clutch when the required number of grains in a hill were dropped from the seedbox to the second drop, and the check-row mechanism was made to throw the clutch in gear while actuating the second drop. This type of planter is superior in many ways to all that preceded it; but it is open to the objection that the clutch in making a complete break with a stop and start to each hill will occasionally get out of order, and another objection is that provision must be made for getting the clutch-breaking mechanism out of operation preparatory to using the planter as a drill.

It is the principal object of my invention to avoid the imperfections above mentioned; and another object is to provide a second drop particularly adapted to coact with the mechanism for actuating and controlling the first drop. The two sets of mechanisms comprise distinct inventions, which mutually contribute to the single physical result of dropping the corn from the planter.

In my improved mechanism for actuating and controlling the first drop the seed-wheels are driven from the covering-wheels at too slow a speed to complete a hill-dropping motion while traveling from one cross-row to another, and motion derived from the check-row mechanism is used to accelerate the motion of the seed-wheels to complete the required movement thereof. The sprocket-wheel on the drill-shaft is journaled loosely, it is driven by the covering-wheels, it has a ratchet face, and it imparts motion to the drill-shaft through a ratchet-wheel fixed onto the shaft. The sprocket-wheel is always in contact with the ratchet-wheel except when the planter is turning around or on the road, and the ratchet-wheel may turn forward, but not backward, independent of the sprocket-wheel. A chain receives motion from the covering-wheels and imparts it to the sprocket-wheel on the drill-shaft. The seed-wheels are driven nearly but not quite a complete hill-dropping movement while the planter is traveling the distance between cross-rows, and motion from the quick-acting check-row mechanism is used to complete the movement of the seed-wheels. As the seed-wheels are always behind time when a cross-row is reached, slippage of the covering-wheels only varies the extent of the shortage, and whether the shortage be little or much the check-row mechanism takes the drill-shaft where it finds it and gives it sufficient accelerated motion to carry the seed-wheels to a completion of a hill-drop motion. When the planter starts away from a cross-row, the seed-wheels begin a hill-dropping movement. As the next cross-row is approached the seed-wheels are more or less behind time; but when a forked lever strikes a knot on a check-row wire the check-row mechanism at once proceeds to make up for slow motion in the seed-wheels.

The inventions are exemplified in the structures hereinafter described, and they are defined in the appended claims.

In the drawings forming part of this specification, Figure 1 is a side elevation of so much of a planter as is directly connected with my improvements, the shank of the planter being broken away to expose the second drop. Fig. 2 is a plan of the sprocket-wheel, the ratchet-wheel, and the accelerating-arm for the drill-shaft. Fig. 3 is a side elevation of the mechanism shown in Fig. 2. Fig. 4 is a plan diagram of the means employed to drive and control the first drop. Fig. 5 is a side elevation of the driving and controlling mechanism for the first drop, illustrating the accelerating action of the check-row shaft on the drill-shaft. Fig. 6 is a vertical section through the planter-shank showing the valves therein in position to permit the corn to be drilled. Fig. 7 is a section through the housing of the accelerating-arm.

The axle-shaft of the covering-wheels is shown at 1. At 2 is shown a sprocket-wheel fixed onto the axle-shaft, and a covering-wheel is shown at 3. The drill-shaft 6 is adapted to impart motion to the seed-wheels of the seedboxes, preferably by means of gear-wheels, as shown at 30 in Fig 4. A sprocket-wheel 5 is journaled loosely on the drill-shaft, and one of its faces is supplied with ratchet-teeth. A chain 4 connects with wheel 2 and wheel 5 and imparts motion from the covering-wheel to the sprocket-wheel 5. A ratchet-wheel 7 is fastened onto the drill-shaft in position to engage the ratchet-teeth thereof. A wheel 8, preferably integral with the ratchet-wheel, has fingers 9, that extend outward and backward with relation to the rotation of the drill-shaft. The front sides of the fingers are eccentric or tangential with relation to the circumference of the wheel, and they form stops to prevent excessive forward motion in the drill-shaft when the check-row mechanism acts on the fingers. A spring 16 fits between a collar 17 and the end of the hub of sprocket-wheel 5, and it tends to hold the ratchet-teeth of the sprocket-wheel in engagement with the teeth of the ratchet-wheel. A collar 15 on the hub of the sprocket-wheel 5 provides means whereby the sprocket-wheel may be drawn from contact with the ratchet-wheel 7 preparatory to turning the planter around.

The check-row shaft 11 extends across the planter parallel with the drill-shaft 6, and adjacent thereto a housing 14 is secured to the check-row shaft in line with fingers 9, and an accelerating-arm 12 has bearings in the housing and protrudes therefrom. The arm 12 is longitudinally slidable in the housing. It has a diminished stem 13 inside the housing, and a spring 36 (shown only in Fig. 7) tends to hold the operative end of the arm protruded from the housing. The seed-wheel 31 (shown only in Fig. 4) has cells adapted to each receive a single grain of corn, and such cells are disposed in sets, the number of which corresponds with the number of fingers 9 on wheel 8. In this instance there are four fingers and four sets of cells, each comprising three cells. The particular seed-wheel shown is intended to plant three grains in each hill; but the number of grains deposited in a hill depends on the number of cells in a quarter-division of the wheel. The seed-wheel is geared to turn as fast as the drill-shaft. A forked lever 33 is secured on the end of the check-row shaft in any desirable manner, and a check-row wire 34, having knots 35, is stretched across the field and laid in the forked lever when the planter is used to plant in check-rows. The wheel 3 makes approximately a one-half rotation while traveling the distance between cross-rows. The wheel 5 is a little more than twice as large as sprocket-wheel 2, and so the finger-wheel and the seed-wheel when left to the action of chain 4 make a little less than a quarter-rotation while traveling from one check-row knot to another. In Fig. 4 the cell 32 is the last cell of a hill group. The knot on the wire in front of the forked lever indicates the point at which the cell should be nearest the covering-wheel, where the discharge-opening is usually placed, and it is obvious that, with about one-third of the one-fourth rotation to complete, the distance to the knot is too short to permit completion of the movement; but when the forked lever strikes the knot and begins to swing backward, as shown in Fig. 5, the accelerating-arm 12 engages a finger 9 and moves the drill-shaft to the position shown in Fig. 1, which is the termination of a one-quarter rotation. The end of the accelerating-arm bears against a front surface 10 of a finger when the quarter-rotation is completed and resists any tendency the shaft may chance to develop to rock too far forward, and as soon as the knot slips past the fork the accelerating-arm is carried to the position shown in Fig. 3 by means of spring X in Fig. 4. As soon as the drill-shaft is free of the accelerating influence of the arm 12 it begins again its comparatively slow rotation, and it continues the same until accelerated by the check-row shaft when another check-row knot is encountered. The planter travels about four feet while the chain is imparting a quarter-rotation to the drill-shaft; but if the motion imparted to the check-row shaft by the knots on the wire were continued it would give the check-row shaft a quarter-rotation while the planter is traveling a little more than one foot, and so the accelerating motion may be nearly four times as fast as the ordinary motion. Ordinarily the accelerating action of the check-row mechanism is slight, and it occurs when the work of moving the seed-wheel is practically completed; but when necessary to bring the drill-shaft up to time from a serious disadjustment the check-row mechanism may be relied on to give about a one-eighth rotation to the drill-shaft. The accelerating-arm is out of contact with the drill-shaft except when forced therein by a check-row knot, and so the planter is always ready to drill, so far as the first drop is concerned. The sprocket-wheel 5 is held continually in contact with the ratchet-wheel 7 while the planter is in operation. There is no complete making and breaking of connections in the sense that a clutch makes and breaks connections, and the drill-shaft moves continuously. The accelerating action causes the ratchets of the ratchet-wheel to advance a tooth or so on the ratchet-teeth of the sprocket-wheel, and the shift is effected while both wheels are traveling in the same direction. If the end of arm 12 should chance to strike square against an end of a finger 9, the spring 36 will yield to permit the completion of the swing of the check-row shaft.

The second-drop movement consists of a plunger, as 28, pivoted at its upper end to a rock-arm 29, which is fastened onto the check-row shaft 11. A valve 23 is pivoted at 24 to close against the front wall of shank 18 when the plunger is raised. A valve 20 is pivoted at 21 to close against a partition 19 in the shank. A connecting-link 26 is pivoted at its upper end to valve 20 in front of pivot 21 and is pivotally connected at its lower end to valve 23 in front of pivot 24. Hook extensions 25 and 22 extend rearward from the pivots of valves 23 and 20, respectively. An eyebolt 37 is secured to the rear surface of link 26, at about the longitudinal center thereof, and a spring 27 is attached at one end to the eyebolt and attachable at the other end to either hook 22 or hook 25. When the planter is used to drop in check-rows, the spring is hitched to hook 22, as shown in Fig. 1, and when the planter is used as a drill the spring is hitched to hook 25, as shown in Fig. 6. When the spring is connected with the upper valve, it tends to hold the valves closed, and when it is in the other position it holds them open.

I claim—

1. In a corn-planter, the combination with a seed-wheel, of means for turning the seed-wheel with a comparatively slow movement while traveling between cross-rows, and means for accelerating the motion of the seed-wheel as a cross-row is neared.

2. In a corn-planter, the combination with furrow-openers, covering-wheels, seedboxes, seed-wheels in the boxes and check-row mechanism, of means actuated from the covering-wheels to turn the seed-wheels with a comparatively slow movement while traveling between cross-rows, and means actuated by the check-row mechanism for accelerating the movement of the seed-wheels as a cross-row is neared.

3. In a corn-planter, the combination with furrow-openers, covering-wheels and check-row mechanism, of seed-wheels having cells each adapted to hold a single grain, means actuated from the covering-wheels to turn the seed-wheels a part only of the rotation needed to drop the number of grains required in a hill while the planter is traveling from one cross-row to another, and means actuated by the check-row mechanism for completing the hill-dropping movement of the seed-wheels as a cross-row is neared.

4. In a corn-planter, the combination with a seed-wheel, a drill-shaft geared to the seed-wheel and a check-row shaft, of a sprocket-wheel journaled loosely on the drill-shaft and having ratchet-teeth, a ratchet-wheel fastened to the drill-shaft and adapted to engage the sprocket-wheel, means for turning the sprocket-wheel and imparting motion therethrough to ratchet-wheel, drill-shaft and seed-wheel, and an arm on the check-row shaft adapted to move the drill-shaft forward in advance of the travel of the sprocket-wheel when the check-row shaft is actuated.

5. In a corn-planter, the combination with a seed-wheel, a drill-shaft geared to the seed-wheel and a check-row shaft, of a sprocket-wheel journaled loosely on the drill-shaft and having ratchet-teeth, a ratchet-wheel fastened to the drill-shaft and adapted to engage the sprocket-wheel, means for turning the sprocket-wheel and imparting motion therethrough to the ratchet-wheel, drill-shaft and seed-wheel, a finger extending from the drill-shaft, and an arm on the check-row shaft adapted to engage the finger and accelerate the rotation of the drill-shaft when the check-row shaft is actuated.

6. In a corn-planter, the combination with a seed-wheel, a drill-shaft geared to the seed-wheel and a check-row shaft, of a sprocket-wheel journaled loosely on the drill-shaft and having ratchet-teeth, a ratchet-wheel fastened to the drill-shaft and adapted to engage the sprocket-wheel, means for turning the sprocket-wheel and imparting motion therethrough to the seed-wheels, a plurality of fingers extending from the drill-shaft at regular intervals around the shaft, and an arm on the check-row shaft adapted to accelerate the rotation of the drill-shaft by forward pressure on one finger and adapted to limit the acceleration by forming an obstruction to the finger following.

7. In a corn-planter, the combination with a seed-wheel, a drill-shaft geared to the seed-wheel and a check-row shaft, of a sprocket-wheel journaled loosely on the drill-shaft and having ratchet-teeth, a ratchet-wheel fastened to the drill-shaft and adapted to engage the sprocket-wheel, means for turning the sprocket-wheel and imparting motion therethrough to the seed-wheels, a finger extending from the drill-shaft and a lengthwise-yielding arm attached to the check-row shaft and adapted to engage the finger and accelerate the motion of the drill-shaft when the check-row shaft is actuated.

8. In a planter, the combination of a hollow shank, a seed-expelling plunger in the shank, a valve-plate at the lower end of the rear part of the shank normally closing against the front wall of the shank below the plunger when the plunger is raised, another valve-plate at the upper end of the rear part of the shank closable against a wall of the shank, a connection between the valves whereby they open and close together, and means for holding them open to convert the planter into a drill.

9. In a planter, the combination of a hollow shank, a seed-expelling plunger in the shank, a valve-plate at the lower end of the rear part of the shank normally closing against the front wall of the shank when the plunger is raised, another valve-plate at the upper end of the rear part of the shank closable against a wall of the shank, a link connecting one valve with the other in front of their pivots, hooks extending from the valves back of the pivots thereof, and a spring attached to the link and attachable to either of the hooks.

In testimony whereof I sign my name in the presence of two subscribing witnesses.

LEVI P. GRAHAM.

Witnesses:
 NORA GRAHAM,
 INA GRAHAM.